United States Patent
Wang et al.

(10) Patent No.: US 10,644,921 B2
(45) Date of Patent: May 5, 2020

(54) METHOD AND DEVICE IN A WIRELESS COMMUNICATION SYSTEM

(71) Applicant: HUAWEI TECHNOLOGIES CO., LTD., Shenzhen, Guangdong (CN)

(72) Inventors: Fan Wang, Shanghai (CN); Fredrik Berggren, Kista (SE); Yinggang Du, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/928,033

(22) Filed: Mar. 21, 2018

(65) Prior Publication Data

US 2018/0212812 A1    Jul. 26, 2018

Related U.S. Application Data

(63) Continuation of application No. PCT/EP2015/071956, filed on Sep. 24, 2015.

(51) Int. Cl.
*H04L 27/26* (2006.01)
*H04L 5/00* (2006.01)
*H04W 56/00* (2009.01)

(52) U.S. Cl.
CPC ........ *H04L 27/2662* (2013.01); *H04L 5/0053* (2013.01); *H04W 56/0005* (2013.01)

(58) Field of Classification Search
CPC ............. H04L 5/0053; H04L 27/2662; H04W 56/0005
See application file for complete search history.

(56) References Cited

U.S. PATENT DOCUMENTS

| | | | | |
|---|---|---|---|---|
| 8,687,741 B1* | 4/2014 | Erell | ..................... | H04W 56/00 375/340 |
| 2013/0242947 A1* | 9/2013 | Chen | ..................... | H04W 72/04 370/335 |
| 2013/0294361 A1* | 11/2013 | Chen | ..................... | H04L 5/0053 370/329 |
| 2014/0301353 A1* | 10/2014 | Frenne | .................... | H04L 5/003 370/330 |
| 2015/0023331 A1* | 1/2015 | You | ....................... | H04L 5/0048 370/336 |
| 2016/0073370 A1* | 3/2016 | Axmon | ............. | H04W 56/0015 370/350 |
| 2016/0330678 A1* | 11/2016 | Yoon | ......................... | H04L 5/00 |

(Continued)

FOREIGN PATENT DOCUMENTS

| CN | 101267226 A | 9/2008 |
|---|---|---|
| CN | 102055701 A | 5/2011 |

(Continued)

OTHER PUBLICATIONS

3GPP TSG RAN WG1 Meeting #80bits R1-151938,"LAA reservation signal design",MediaTek Inc.,Apr. 20-24, 2015,total 4 pages.

(Continued)

*Primary Examiner* — Benjamin H Elliott, IV
(74) *Attorney, Agent, or Firm* — Womble Bond Dickinson (US) LLP

(57) ABSTRACT

A processor is configured to map at least two synchronisation signal sequences to a respective set of resource elements of an OFDM symbol, wherein there is at least one resource element between each pair of adjacent sets of resource elements.

18 Claims, 8 Drawing Sheets

(56) References Cited

U.S. PATENT DOCUMENTS

2017/0099655 A1\* 4/2017 Golitschek Edler von
                                  Elbwart ................ H04L 5/0042
2018/0212812 A1\* 7/2018 Wang ................... H04L 5/0053

FOREIGN PATENT DOCUMENTS

| CN | 102273160 A | 12/2011 |
|----|-------------|---------|
| CN | 103402251 A | 11/2013 |
| EP | 2101459 A1  | 9/2009  |
| EP | 2605443 A2  | 6/2013  |

OTHER PUBLICATIONS

3GPP TSG RAN WG1 Meeting #82 R1-154344,"Preamble for LAA",Huawei, HiSilicon,Aug. 24-28, 2015,total 6 pages.
Xunwei Zhao et al, 3GPP Long Term Evolution Architecture and Specification. Posts and Telecom Press, Jan. 2010, 6 pages.

\* cited by examiner

METHOD AND DEVICE IN A WIRELESS COMMUNICATION SYSTEM

CROSS-REFERENCE TO RELATED APPLICATIONS

This application is a continuation of International Application No. PCT/EP2015/071956, filed on Sep. 24, 2015, the disclosure of which is hereby incorporated by reference in its entirety.

TECHNICAL FIELD

Embodiments described herein generally relate to a processor and a method in a processor. In particular herein described is a mechanism for mapping of multiple synchronisation sequences to one Orthogonal Frequency-Division Multiplexing (OFDM) symbol.

BACKGROUND

It has been discussed in the 3rd Generation Partnership Project (3GPP) Long Term Evolution (LTE) standard that Discovery Reference Signals (DRS), also referred as discovery signal, could be used for Radio Resource Management (RRM) measurement as well as synchronisation in the topic of Licensed Assisted Access (LAA). LAA is sometimes also referred to as Licensed-Assisted Carrier Aggregation and concerns aggregation of a carrier wherein a primary cell is using a licensed spectrum to deliver critical information and guaranteed Quality of Service, and an unlicensed spectrum to opportunistically boost the transmitted data rate. The DRS detection is expected to be on one-shot basis.

In e.g. LTE Evolved UMTS Terrestrial Radio Access (E-UTRA), OFDM is used in the downlink; i.e. from a cell site to a User Equipment (UE). OFDM is a frequency-division multiplexing scheme used as a digital multi-carrier modulation method. A large number of closely spaced orthogonal sub-carrier signals are used to carry data on several parallel data streams or channels.

For synchronisation purpose, the current synchronisation signal design for DRS with one length-62 Primary Synchronisation Signal (PSS) sequence and one length-62 Secondary Synchronisation Signal (SSS) sequence is not sufficient to support one-shot synchronisation in a low serving cell Signal-to-Noise Ratio (SNR) condition, e.g. SNR of −3 dB. Typically, the User Equipment (UE) according to previously known synchronisation signalling schemes need to detect the synchronisation signals successfully in multiple occasions in such a SNR condition. For DRS detection, the synchronisation signals shall satisfy one shot DRS measurement in a neighbour cell SNR condition, e.g. SNR of −6 dB. Therefore current DRS synchronisation signal design has to be enhanced in terms of performance.

Further, one key feature of LTE PSS is to enable low-complex receiver implementations which needs a symmetry property of the signal in the time domain.

In a first piece of prior art, the Licensed-Assisted Access (LAA) e-NodeB (eNB) transmits LAA DRS as in the form of Rel-12 DRS, which consists of one PSS sequence, one SSS sequence, antenna port 0 CRS and potentially Channel State Information Reference Signal (CSI-RS), if configured.

In a second piece of prior art, the LAA eNB repeats multiple synchronisation sequences in the frequency domain, e.g. the PSS and/or SSS sequence is repeated in the entire transmission bandwidth of the LAA system.

However, the disadvantages of the prior art can be summarised; firstly, DRS detection based on one shot is not ensured if a Long Term Evolution (LTE) Release 12 DRS is reused for LAA.

Secondly, it has not been shown how multiple synchronisation sequence shall be mapped in the frequency domain to achieve good detection performance as well as low complex receiver implementations.

The problem is how a transmitter such as an LAA eNB, transmits an OFDM symbol comprising multiple synchronisation sequences which provides good performance while also facilitates low complexity of the receiver.

It would thus be desired to provide a solution on how to map multiple synchronisation sequences to the OFDM symbol to achieve better synchronisation performance and low complex receiver implementations.

SUMMARY

It is therefore an object to obviate at least some of the above mentioned disadvantages and to improve the performance in a wireless communication system.

This and other objects are achieved by the features of the appended independent claims. Further implementation forms are apparent from the dependent claims, the description and the figures.

According to a first aspect, a processor is provided, configured to map at least two synchronisation signal sequences to a respective set of resource elements of one OFDM symbol, wherein there is at least one intermediate resource element between each pair of adjacent sets of resource elements.

Thanks to the presented concept of introducing one or more intermediate resource elements between the synchronisation signal sequences, wherein no synchronisation signal sequences are transmitted, the respective adjacent synchronisation signal sequence becomes distributed in the frequency domain, increasing frequency diversity. The adjacent sets of resource elements are adjacent in the frequency domain, not in the time domain as all resource elements of the OFDM symbol are located at the same time period. Thereby a good robustness in case of frequency error is achieved. Furthermore, by establishing a frequency symmetry property of the synchronisation signal sequences, low complexity implementation at the receiver side is ensured.

In a first possible implementation of the processor according to the first aspect, the processor may be configured to disallow transmission of a Physical Downlink Shared Channel (PDSCH), a Cell-specific Reference Signal (CRS) and/or a Channel State Information Reference Signal (CSI-RS) in the at least one intermediate resource element between each pair of adjacent sets of resource elements.

Thereby, by avoiding to transmit any of the enumerated channels/signals, the frequency domain symmetry property of the synchronisation signal sequences is ensured and thus the synchronisation signal time symmetry is maintained, enabling low-complex receiver implementation.

In a second possible implementation of the processor according to the first aspect, or the first possible implementation of the processor according to the first aspect, the processor may be configured to disallow transmission of any signal or channel in the at least one intermediate resource element between each pair of adjacent sets of resource elements.

By not transmitting any signals at all in the at least one intermediate resource element between each pair of adjacent sets of resource elements, each component synchronisation signal sequence will suffer less interference from the adjacent carriers and thus becomes easier to detect for the receiver, especially in the case that one individual filter is used for one respective component synchronisation signal sequence.

In a third possible implementation of the processor according to the first aspect, or any previous possible implementation of the processor according to the first aspect, the processor may be configured to map the at least two synchronisation signal sequences to the respective set of resource elements of the OFDM symbol, wherein there are at least five resource elements between each pair of adjacent sets of resource elements.

By putting at least five resource elements between each pair of adjacent sets of resource elements, the detection of the respective synchronisation signal sequence by the receiver is further facilitated as the respective sets of resource elements are clearly distinguishable, which is especially helpful to reusing an LTE release 8 synchronisation signal based filter implementation as the same empty resource elements are maintained. Also, the robustness in case of frequency error is further enhanced.

In a fourth possible implementation of the processor according to the first aspect, or any previous possible implementation of the processor according to the first aspect, the processor may be configured to map the at least two synchronisation signal sequences, to the respective set of resource elements of the OFDM symbol, wherein $delta^0$ is smaller than $delta_1$, and:

wherein $delta_1$ is the number of intermediate resource elements between at least one pair of adjacent sets of resource elements; and $delta^0$ is derived from one of the following:

$delta_0=k_0-k_2$, where $k_0$ is the lowest frequency index of said resource elements, and $k_2$ is the lowest frequency index of all the resource elements of the OFDM symbol;

$delta_0=k_3-k_1$, where $k_1$ is the highest frequency index of said resource elements, and $k_3$ is the highest frequency index of all the resource elements of the OFDM symbol;

$delta_0=(12\times(\text{ceil}((k_1-k_0+1)/12))-(k_1-k_0+1))/2$, where $k_0$ is the lowest frequency index of the resource elements, $k_1$ is the highest frequency index of the resource elements, ceil (x) means the smallest integer not smaller than x.

By introducing a first frequency gap $delta_1$ between the adjacent pairs of synchronisation signal sequences, and a second frequency gap $delta_0$ in other resource elements within the OFDM symbol wherein no synchronisation signal sequences are mapped, wherein $delta_0$ is smaller than $delta_1$, thereby introducing different gap lengths between the synchronisation signal sequences and between the edge synchronisation signal sequence and the band edge or the PRB edge containing synchronisation signal sequences, maximum frequency diversity is ensured while a similar guard band for each individual synchronisation signal sequence is provided.

In a fifth possible implementation of the processor according to the first aspect, or any previous possible implementation of the processor according to the first aspect, the processor may be configured to map the at least two synchronisation signal sequences with the same number of synchronisation signal sequences for at least two different transmission bandwidth values.

Thereby the same repetition factor for the synchronisation signal sequences could be used for different bandwidth options such as e.g. 5 MHz and 20 MHz. By applying the same repetition factor, same or similar synchronisation performance can be achieved for different bandwidth options, which allows an efficient usage of the time frequency resource especially for a large bandwidth system.

In a sixth possible implementation of the processor according to the first aspect, or any previous possible implementation of the processor according to the first aspect, the processor may be configured to map the at least two synchronisation signal sequences, to the respective set of resource elements of the OFDM symbol, wherein $delta_2$ is the same for at least two different transmission bandwidth values, where $delta_2=-k_0$; $k_0$ is the lowest frequency index of the resource elements, and $k_1$ is the highest frequency index of the resource elements.

Thereby, a bandwidth independent transmitter and receiver implementation can be achieved and thus further reduce the implementation complexity.

In a seventh possible implementation of the processor according to the first aspect, or any previous possible implementation of the processor according to the first aspect, there are another set of resource elements of the OFDM symbol used for transmission of at least one of the following: a PDSCH, a CRS or a CSI-RS.

By utilising frequency resources of the OFDM symbol, not used neither for synchronisation signal sequences, nor for any intermediate frequency gaps, for transmitting reference signals or data channels such as e.g. PDSCH, CRS or CSI-RS, further functionality and advantages such as better spectrum efficiency and/or better measurement performance are achieved.

In an eight possible implementation of the processor according to the first aspect, or any previous possible implementation of the processor according to the first aspect, the processor may be configured to map each of the at least two synchronisation signal sequences to 62 resource elements.

Thereby, e.g. an LTE release-8 synchronisation signal sequence may be reused, advantageous in terms of low specification and implementation impact.

In a ninth possible implementation of the processor according to the first aspect, or any previous possible implementation of the processor according to the first aspect, the processor may be configured to communicate by aggregation of a carrier in a licensed frequency spectrum and a carrier in an unlicensed frequency spectrum. Also, the at least two synchronisation signal sequences may comprise Primary Synchronisation Signals (PSS), Secondary Synchronisation Signals (SSS), or a combination thereof.

Thereby further specifications are provided, leading to additional advantages in an LAA environment.

In a tenth possible implementation of the processor according to the first aspect, or any previous possible implementation of the processor according to the first aspect, the processor may be configured to map the same number of intermediate resource elements between each pair of adjacent sets of resource elements in the OFDM symbol.

By dedicating the same number of intermediate resource elements between each of the adjacent sets of resource elements, implementation both at transmitter side and receiver side is simplified. Additionally, a frequency gap of the same size is ensured for each pair of adjacent synchronisation signal sequences, which helps to implement the filters with a same pass band.

In an eleventh possible implementation of the processor according to the first aspect, or any previous possible implementation of the processor according to the first aspect, the processor may be configured to map the at least two synchronisation signal sequences, to the respective set of resource elements of the OFDM symbol, wherein there are an even number of intermediate resource elements between at least one pair of adjacent resource elements when there are an even number of synchronisation signal sequences mapped to the OFDM symbol.

Thereby it allows the mapping of two adjacent synchronisation signal sequences around the Direct Current (DC) subcarrier with an even number of intermediate resource elements in between, which helps to maintain the frequency symmetry of the synchronisation signals sequence around the DC carrier.

According to a second aspect, a method is provided to be performed by a processor according to the first aspect. The method comprises mapping each of the synchronisation signal sequences to a respective set of resource elements of the OFDM symbol, wherein there is at least one intermediate resource element between each pair of adjacent sets of resource elements.

Thanks to the presented concept of introducing one or more intermediate resource elements between the synchronisation signal sequences, wherein no synchronisation signal sequences are transmitted, the respective adjacent synchronisation signal sequence becomes distributed in the frequency domain, increasing frequency diversity. The adjacent sets of resource elements are adjacent in the frequency domain, not in the time domain as all resource elements of the OFDM symbol are located at the same time period. Thereby a good robustness in case of frequency error is achieved. Furthermore, by establishing a frequency symmetry property of the synchronisation signal sequences, low complexity implementation at the receiver side is ensured.

In a first possible implementation of the method according to the second aspect, transmission of a PDSCH, a CRS and/or a CSI-RS may be disallowed in the at least one intermediate resource element between each pair of adjacent sets of resource elements.

Thereby, by avoiding to transmit any of the enumerated channels/signals, the frequency domain symmetry property of the synchronisation signal sequences is ensured and the thus the synchronisation signal time symmetry is maintained, enabling low-complex receiver implementation.

In a second possible implementation of the method according to the second aspect, or the first possible implementation of the method according to the second aspect, transmission of any signal or channel at all in the at least one intermediate resource element between each pair of adjacent sets of resource elements may be disallowed.

By not transmitting any signals at all in the at least one intermediate resource element between each pair of adjacent sets of resource elements, each component synchronisation signal sequence will suffer less interference from the adjacent carriers and thus becomes easier to detect for the receiver, especially in the case one individual filter is used for one respective component synchronisation signal sequence.

In a third possible implementation of the method according to the second aspect, or any previous possible implementation thereof, the method may comprise mapping the at least two synchronisation signal sequences to the respective set of resource elements of the OFDM symbol, wherein there are at least five intermediate resource elements between each pair of adjacent sets of resource elements.

By putting at least five resource elements between each pair of adjacent sets of resource elements, the detection of the respective synchronisation signal sequence by the receiver is further facilitated as the respective sets of resource elements are clearly distinguishable, which is especially helpful to reusing an LTE release 8 synchronisation signal based filter implementation as the same empty resource elements are maintained. Also, the robustness in case of frequency error is further enhanced.

In a fourth possible implementation of the method according to the second aspect, or any previous possible implementation thereof, the method may further comprise mapping the at least two synchronisation signal sequences, to the respective set of resource elements of the OFDM symbol, wherein delta$^0$ is smaller than delta$_1$, and:

wherein delta$_1$ is the number of intermediate resource elements between at least one pair of adjacent sets of resource elements; and delta$^0$ is derived from one of the following:

delta$_0$=k$_0$−k$_2$, where k$_0$ is the lowest frequency index of said resource elements, and k$_2$ is the lowest frequency index of all the resource elements of the OFDM symbol;

delta$_0$=k$_3$−k$_1$, where k$_1$ is the highest frequency index of said resource elements, and k$_3$ is the highest frequency index of all the resource elements of the OFDM symbol;

delta$_0$=(12×(ceil ((k$_1$−k$_0$+1)/12))−(k$_1$−k$_0$+1))/2, where k$_0$ is the lowest frequency index of the resource elements, k$_1$ is the highest frequency index of the resource elements, ceil (x) means the smallest integer not smaller than x.

By introducing a first frequency gap delta$_1$ between the adjacent pairs of synchronisation signal sequences, and a second frequency gap delta$_0$ in other resource elements within the OFDM symbol wherein no synchronisation signal sequences are mapped, wherein delta$_0$ is smaller than delta$_1$, thereby introducing different gap lengths between the synchronisation signal sequences and between the edge synchronisation signal sequence and the band edge or the PRB edge containing synchronisation signal sequences, maximum frequency diversity is ensured while a similar guard band for each individual synchronisation signal sequence is provided.

In a fifth possible implementation of the method according to the second aspect, or any previous possible implementation thereof, the method may also comprise mapping the at least two synchronisation signal sequences with the same number of synchronisation signal sequences for at least two different transmission bandwidth values.

Thereby the same repetition factor for the synchronisation signal sequences could be used for different bandwidth options such as e.g. 5 MHz and 20 MHz. By applying the same repetition factor, same or similar synchronisation performance can be achieved for different bandwidth options, which allows an efficient usage of the time frequency resource especially for a large bandwidth system.

In a sixth possible implementation of the method according to the second aspect, or any previous possible implementation thereof, the method may also comprise mapping the at least two synchronisation signal sequences, to the respective set of resource elements of the OFDM symbol, wherein delta$_2$ is the same for at least two different transmission bandwidth values, where delta$_2$=k$_1$−k$_0$; k$_0$ is the lowest frequency index of the resource elements, and k$_1$ is the highest frequency index of the resource elements.

Thereby, a bandwidth independent transmitter and receiver implementation can be achieved and thus further reduces the implementation complexity.

In a seventh possible implementation of the method according to the second aspect, or any previous possible implementation thereof, the method may further comprise utilising another set of resource elements of the OFDM symbol used for transmission of at least one of the following: a PDSCH, a CRS or a CSI-RS.

By utilising frequency resources of the OFDM symbol, not used either for synchronisation signal sequences, or for any intermediate frequency gaps, for transmitting reference signals or data channels such as e.g. PDSCH, CRS or CSI-RS, further functionality and advantages such as better spectrum efficiency and/or better measurement performance are achieved.

In an eight possible implementation of the method according to the second aspect, or any previous possible implementation thereof, the method may further comprise mapping each of the at least two synchronisation signal sequences to 62 resource elements.

Thereby, e.g. an LTE release-8 synchronisation signal sequence may be reused, advantageous in terms of low specification and implementation impact.

In a ninth possible implementation of the method according to the second aspect, or any previous possible implementation thereof, the method may further comprise aggregating a carrier in a licensed frequency spectrum and a carrier in an unlicensed frequency spectrum. Also, the at least two synchronisation signal sequences may comprise Primary Synchronisation Signals (PSS), Secondary Synchronisation Signals (SSS), or a combination thereof.

Thereby further specifications are provided, leading to additional advantages in an LAA environment.

In a tenth possible implementation of the method according to the second aspect, or any previous possible implementation thereof, the method may comprise mapping the same number of resource elements between each pair of adjacent sets of resource elements in the OFDM symbol.

By dedicating the same number of intermediate resource elements between each of the adjacent sets of resource elements, implementation both at transmitter side and receiver side is simplified. Additionally, a frequency gap of the same size is ensured for each pair of adjacent synchronisation signal sequences, which helps to implement the filters with a same pass band.

In an eleventh possible implementation of the method according to the second aspect, or any previous possible implementation thereof, the method may comprise mapping the at least two synchronisation signal sequences, to the respective set of resource elements of the OFDM symbol, wherein there are an even number of intermediate resource elements between at least one pair of adjacent resource elements when there are an even number of synchronisation signal sequences mapped to the OFDM symbol.

Thereby it allows the mapping of two adjacent synchronisation signal sequences around the Direct Current (DC) subcarrier with an even number of intermediate resource elements in between, which helps to maintain the frequency symmetry of the synchronisation signals sequence around the DC carrier.

According to a third aspect, a computer program is provided, comprising program code for performing a method according to the second aspect, or any possible implementation of the method according to the second aspect, for mapping at least two synchronisation signal sequences to a respective set of resource elements of the OFDM symbol, when the computer program is performed on a processor according to the first aspect, or any possible implementation of the processor according to the first aspect.

Thereby advantages are achieved, corresponding with the previously described advantages of the first and second aspects.

According to a fourth aspect, a transmitter is provided, for transmitting the OFDM symbol comprising at least two synchronisation signal sequences. The transmitter comprises a processor according to the first aspect, or any possible implementation of the processor according to the first aspect. Further the transmitter also comprises a transmitting circuit, configured to transmit the OFDM symbol comprising the multiple synchronisation signal sequences to a receiver.

Thereby advantages are achieved, corresponding with the previously described advantages of the first and second aspects.

According to a fifth aspect, a second processor is provided. The second processor is configured to de-map at least two synchronisation signal sequences from a respective set of resource elements of the OFDM symbol, wherein there is at least one intermediate resource element between each pair of adjacent sets of resource elements, wherein the at least two synchronisation signal sequences have been mapped to the respective set of resource elements of the OFDM symbol by a processor according to the first aspect, or any possible implementation thereof.

Thereby advantages are achieved, corresponding with the previously described advantages of the first and second aspects.

According to a sixth aspect, a method is provided, to be performed by a processor according to the fifth aspect. The method comprises detecting each of the synchronisation signal sequences to a respective set of resource elements of the OFDM symbol, wherein there is at least one intermediate resource element between each pair of adjacent sets of resource elements, wherein the at least two synchronisation signal sequences have been mapped to the respective set of resource elements of the OFDM symbol by a processor according to the first aspect, or any possible implementation thereof.

Thereby advantages are achieved, corresponding with the previously described advantages of the first and second aspects.

According to a seventh aspect, a computer program is provided, comprising program code for performing a method according to the sixth aspect, for detecting at least two synchronisation signal sequences to a respective set of resource elements of the OFDM symbol, when the computer program is performed on a processor according to the fifth aspect.

Thereby advantages are achieved, corresponding with the previously described advantages of the first and second aspects.

According to an eight aspect, a receiver is provided, for receiving the OFDM symbol comprising at least two synchronisation signal sequences. The receiver comprises a processor according to the fifth aspect. Further the receiver also comprises a receiving circuit, configured to receive the OFDM symbol comprising the multiple synchronisation signal sequences from a transmitter according to the fourth aspect.

Thereby advantages are achieved, corresponding with the previously described advantages of the first and second aspects. Thus an improved performance within a wireless communication system is provided.

Other objects, advantages and novel features of the aspects of the invention will become apparent from the following detailed description.

BRIEF DESCRIPTION OF THE DRAWINGS

Various embodiments are described in more detail with reference to attached drawings in which.

DETAILED DESCRIPTION

Embodiments of the invention described herein are defined as a processor and a method in a processor, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
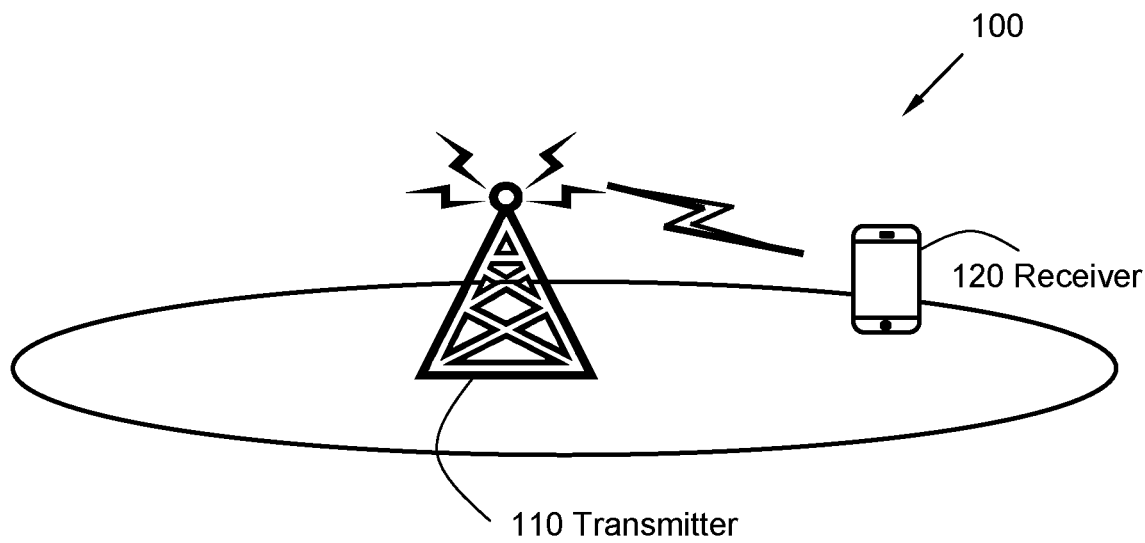
FIG. 1 is a block diagram illustrating a wireless communication system according to some embodiments.

FIG. 1 is a schematic illustration over a wireless communication system 100 comprising a transmitter 110 communicating with a receiver 120.

The transmitter 110 and the receiver 120 may be configured for LAA communication, i.e. to aggregate a primary cell, using licensed spectrum, to deliver critical information and guaranteed Quality of Service, and a co-located secondary cell, using unlicensed spectrum, to opportunistically boost data rate on a best effort basis.

Such primary cell may at least partly be based on e.g. 3GPP LTE, LTE-Advanced, LTE fourth generation mobile broadband standard, Evolved Universal Terrestrial Radio Access Network (E-UTRAN), etc. The secondary cell may be based on e.g. LTE, WiFi or any other non-licensed communication technology, just to mention some few options.

The expressions "wireless communication network", "wireless communication system" and/or "cellular telecommunication system" may within the technological context of this disclosure sometimes be utilised interchangeably.

In the illustrated wireless communication system 100, the transmitter 110 comprises a radio network node and the receiver 120 comprises a UE, wherein the radio network node may be serving one or more cells.

The purpose of the illustration in FIG. 1 is to provide a simplified, general overview of the methods and nodes, such as the transmitter 110 and receiver 120 herein described, and the functionalities involved.

The transmitter 110 according to some embodiments be referred to as e.g. a radio network node, a base station, a NodeB, an eNodeB, a base transceiver station, an Access Point Base Station, a base station router, a Radio Base Station (RBS), a macro base station, a micro base station, a pico base station, a femto base station, a Home eNodeB, a sensor, a beacon device, a relay node, a repeater or any other network node configured for communication with the receiver 120 over a wireless interface, depending e.g. on the radio access technology and terminology used.

Sometimes, the expression "cell" may be used for denoting the radio network node itself. However, the cell may also in normal terminology be used for the geographical area where radio coverage is provided by the radio network node at a base station site. One radio net-work node, situated on the base station site, may serve one or several cells. The radio network nodes may communicate over the air interface operating on radio frequencies with any UE within range of the respective radio network node.

The receiver 120 may correspondingly, in some embodiments, be represented by e.g. a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the transmitter 110, according to different embodiments and different vocabulary used. The receiver 120 in the present context may be, for example, portable, pocket-storable, hand-held, computer-comprised, or vehicle-mounted mobile devices, enabled to communicate voice and/or data, via the radio access network, with another entity, such as another UE or a server.

The transmitter 110 is configured to transmit radio signals comprising information to be received by the receiver 120. Correspondingly, the receiver 120 is configured to receive radio signals comprising information transmitted by the transmitter 110.

The illustrated network setting of one receiver 120 and one transmitter 110 in FIG. 1, is to be regarded as non-limiting examples of different embodiments only. The wireless communication system 100 may comprise any other number and/or combination of transmitters 110 and/or receiver/s 120, although only one instance of a receiver 120 and a transmitter 110, respectively, are illustrated in FIG. 1, for clarity reasons. A plurality of receivers 120 and transmitters 110 may further be involved in some embodiments.

Thus whenever "one" or "a/an" receiver 120 and/or transmitter 110 is referred to in the present context, a plurality of receivers 120 and/or transmitter 110 may be involved, according to some embodiments.

Figure 2:
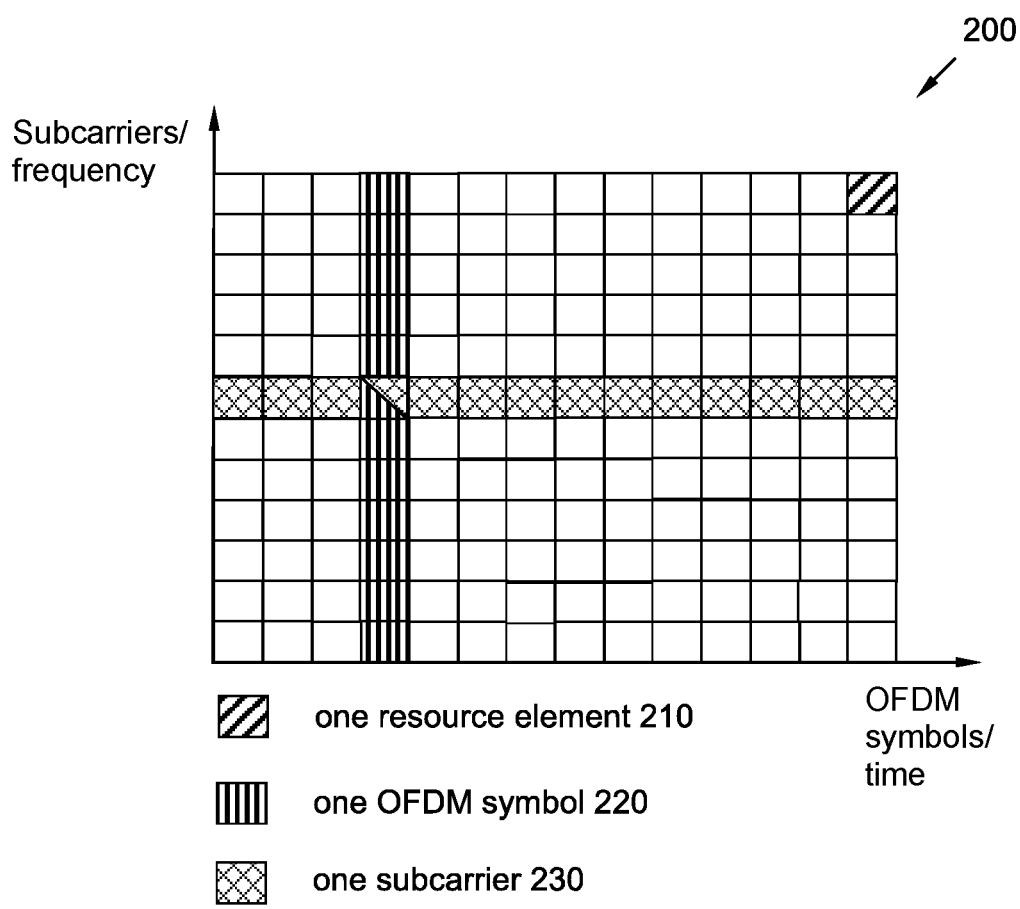
FIG. 2 is a block diagram illustrating a time-frequency resource grid according to an embodiment of the invention.

The transmitter 110 is configured for using Orthogonal Frequency Division Multiplexing (OFDM) for the downlink transmission, i.e. from the transmitter 110 to the receiver 120 to transmit data over many narrow band careers of 180 KHz each instead of spreading one signal over the complete 5 MHz career bandwidth i.e. OFDM uses a large number of narrow subcarriers for multi-carrier transmission to carry data. OFDM is a frequency-division multiplexing scheme used as a digital multi-carrier modulation method. The basic downlink physical resource can be seen as a time-frequency grid as illustrated in FIG. 2.

Multiple synchronisation signal sequences are mapped to the resource elements in a distributed way, i.e. there is at least one resource element between two adjacent frequency regions comprising synchronisation signal sequences, wherein no synchronisation signal sequences are mapped. Specifically, the LAA transmitter 110, such as e.g. LAA eNB, may transmit the OFDM symbol with multiple synchronisation signal sequences wherein each synchronisation signal sequence is mapped to a number of resource elements. Further there is at least one intermediate resource element between the resource elements of the two different component, adjacent, synchronisation signal sequences. The adjacent sets of resource elements as discussed in this disclosure are adjacent in the frequency domain, not in the time domain as all resource elements of the OFDM symbol are located at the same time period.

The at least one intermediate resource element between the two different component, adjacent, synchronisation signal sequences thus may form a frequency gap, distinguishing the respective synchronisation signal sequences in the frequency domain.

Also, nothing may be transmitted in the intermediate resource elements within the frequency gap according to some embodiments, e.g. no Cell-specific Reference Signal (CRS), no Physical Downlink Shared Channel (PDSCH), no Channel State Information Reference Signal (CSI-RS) nor any other physical channel or signal.

The advantages herewith comprise increased frequency diversity, good robustness in case of frequency error, time symmetry property of the signal as well as simple receiver 120 complexity.

Furthermore the frequency region of the multiple synchronisation signal sequences may in some embodiments be as wide as possible at least for the smallest bandwidth option. Specifically there may be an edge gap between the entire frequency region mapped by multiple synchronisation signal sequences and the band edge. The edge gap may be smaller than the gap between the resource elements of the two different component synchronisation signal sequences in some embodiments. This may maximise or at least increase the frequency diversity gain as well as maintain similar guard band for each individual synchronisation signal sequences.

The transmitter 110 further, in some embodiments may use a unique pattern of synchronisation signals in different transmission bandwidth options. Thereby, receiver complexity is reduced while offering a sufficient synchronisation performance.

Further the transmitter 110, which may be an LAA device, may transmit the OFDM symbol with multiple synchronisation signal sequences such as e.g. PSS and/or SSS sequences as well as CRS in some embodiments. Multiple synchronisation signal sequences may be located around the central frequency of the transmission band, while CRS (or similar reference signals) may only be transmitted outside of the synchronisation signal sequences frequency region.

FIG. 2 illustrates a time-frequency resource grid 200 comprising resource elements 210.

The resource element 210 is the smallest time-frequency entity that can be used for transmission, which may convey a complex-valued modulation symbol on a subcarrier 230. A Resource Block (RB) comprises a set of resource elements 210, i.e. a set of time-frequency resources, and may be of 0.5 ms duration (or 7 OFDM symbols 220) and 180 kHz bandwidth (or 12 subcarriers 230 with 15 kHz spacing) in some embodiments.

The transmission bandwidth of the system 100 may be e.g. 5 MHz, 10 MHz, 15 MHz, 20 MHz or similar, may be divided into a set of resource blocks. Typical carrier bandwidths may correspond to e.g. 25, 50, 75 and/or 100 resource blocks in different embodiments. Each transmission of user data on the PDSCH may be performed over 1 ms duration, which is also referred to as a subframe, on one or several resource blocks. A radio frame comprises 10 subframes, or alternatively 20 slots of 0.5 ms length (enumerated from 0 to 19).

In one embodiment, the transmitter 110 may transmit an OFDM symbol 220 comprising multiple component synchronisation signal sequences in a DRS subframe, wherein different component synchronisation signal sequences are mapped in a distributed way, i.e. there is a frequency gap between two different component synchronisation signal sequences mapped adjacently, and wherein neither any PDSCH, Cell-specific Reference Signal (CRS), Channel State Information Reference Signal (CSI-RS) may be mapped in the intermediate resource elements of the frequency gap, in some embodiments. In some embodiments, nothing may be mapped in the intermediate resource elements of the frequency gap, as will be further discussed and explained in conjunction with presentation of FIGS. 3, 5A-5B, 6 and 7.

In LTE, the time-continuous signal $s_l^{(p)}(t)$ on antenna port p in OFDM symbol l in a downlink slot is defined by:

$$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lceil N_{RB}^{DL} N_{sc}^{RB}/2 \rceil} a_{k^{(+)},l}^{(p)} \cdot e^{j2\pi k \Delta f(t-N_{CP,l}T_s)}$$

for $0 \leq t < (N_{CP,l}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$, $T_s=1/(15000*2048)$ second $N_{sc}^{RB}=12$ and $N_{RB}^{DL}$ is related to the system bandwidth, e.g. 100 for 20 MHz bandwidth, 25 for 5 MHz bandwidth. The variable N equals 2048 for $\Delta f=15$ kHz subcarrier spacing and 4096 for $\Delta f=7.5$ kHz subcarrier spacing. $a_{k^{(+)},l}^{(p)}$ is the modulated symbol or value mapped to the resource elements (k,l) on antenna p. The OFDM symbols 220 in a slot shall be transmitted in increasing order of l, starting with l=0, where OFDM symbol l>0 starts at time $\Sigma_{l'=0}^{l-1}(N_{CP,l'}+N)T_s$ within the slot. The value of $N_{CP,l}$ is given in Table 1. As the focus herein is put on the transmission on one antenna port, the antenna port p may be omitted for simplicity.

TABLE 1

| Configuration | | Cyclic prefix length $N_{CP,l}$ |
|---|---|---|
| Normal cyclic prefix | Δf = 15 kHz | 160 for l = 0 |
| | | 144 for l = 1, 2, . . . , 6 |
| Extended cyclic prefix | Δf = 15 kHz | 512 for l = 0, 1, . . . , 5 |
| | Δf = 7.5 kHz | 1024 for l = 0, 1, 2 |

The synchronisation signal sequence such as e.g. Primary Synchronisation Signal (PSS) may be generated in order to enable low-complex receiver implementations. The sequence d(n) used for the synchronisation signal sequence may be generated from a frequency-domain Zadoff-Chu sequence according to:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u is chosen from 25, 39, 34.

Without loss of generality, consider the following representation of a sampled OFDM symbol 220 (without cyclic prefix and no frequency error) with multiple synchronisation signal sequences mapped $$s_u(n) = \frac{1}{\sqrt{N}}\sum_{k=0}^{N-1} H_u(k)W_N^{-kn}, k = 0, 1, \ldots, N-1$$

$$W_N = \exp\left(-\frac{j2\pi}{N}\right), j = \sqrt{-1}$$

where $H_u$ are the Fourier coefficients of the OFDM symbol 220 to which multiple synchronisation signal sequences are mapped.

Figure 3:
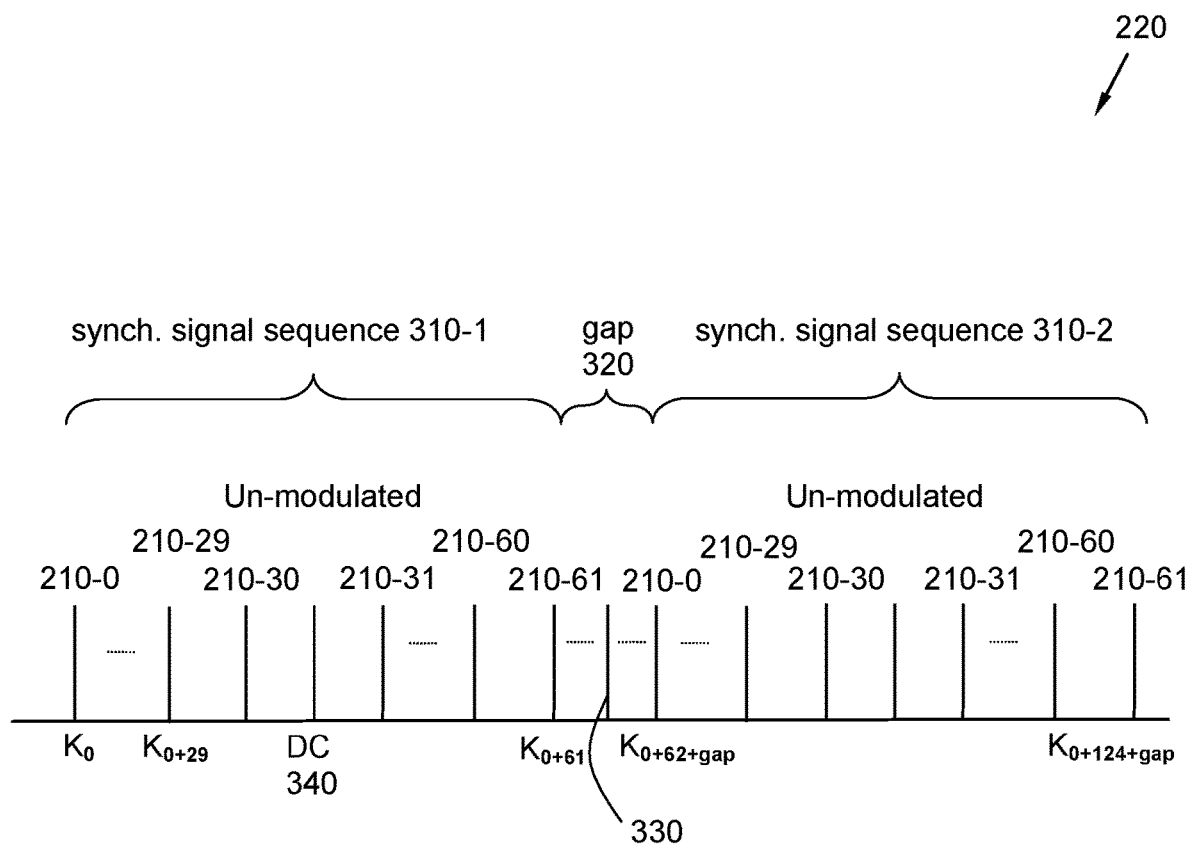
FIG. 3 is a block diagram illustrating distributed mapping of synchronisation sequences in an OFDM symbol, according to an embodiment.

FIG. 3 illustrates the OFDM symbol 220 wherein multiple, i.e. at least two, synchronisation signal sequences 310-1, 310-2 are mapped to the resource elements 210 using localised mapping and distributed mapping, respectively.

There are basically two means to map the at least two synchronisation signal sequences to one OFDM symbol 220, i.e. localised or distributed way. An example of mapping with a first synchronisation signal sequence 310-1 and a second synchronisation signal sequence 310-2 (the root index u is the same and omitted for simplicity) is illustrated in FIG. 3, wherein the gap 320 comprises zero intermediate resource elements 330 in localised mapping and any arbitrary number of intermediate resource elements 330 exceeding zero in distributed mapping, such as e.g. at least one intermediate resource element 330 and/or at least five intermediate resource elements 330 in some embodiments (non-limited examples). Thus the first synchronisation signal sequence 310-1 and the second synchronisation signal sequence 310-2 are mapped to two respective sets of resource elements 210-1, 210-2, . . . , 210-61.

One advantage of the distributed mapping is that it provides frequency diversity. If one component synchronisation signal sequence 310-1, 310-2 mapped to one partial frequency resource is in a deep fading, another component synchronisation signal sequence 310-1, 310-2 mapped to a different frequency resource located distributed may still be able to provide reliable performance as the fading condition might be dramatically different, due to the frequency gap 320 and the at least one intermediate resource element 330 held therein.

If there is a carrier frequency offset, a sampled OFDM symbol 220 can be:

$$r_u(n) = \frac{1}{\sqrt{N}}\sum_{k=0}^{N-1} H_u(k)W_n^{-kn}\exp\left(\frac{j2\pi n\Delta f_1}{N\Delta f}\right), k = 0, 1, \ldots, N-1$$

where $\Delta f_1$ is the carrier frequency offset.

The synchronisation signal sequence detection may in some embodiments be done by matched filtering:

$$\rho(\Delta) = \sum_{n=0}^{N-1} s_u(n)r_u^*(n+\Delta)$$

Since multiple synchronisation signal sequences 310-1, 310-2 are mapped to one OFDM symbol 220, one detection implementation may utilise multiple matched filters for the legacy synchronisation signal sequence 310-1, 310-2. For each component synchronisation signal sequences 310-1, 310-2, a corresponding bandpass filter with the associated pass band may be used. As the bandpass filter is practically not ideal and subject to the implementation, one component synchronisation signal sequence 310-1, 310-2 with localised mapping will experience interference from the adjacent subcarriers 230 which are mapped by one other component synchronisation signal sequence 310-1, 310-2. Therefore distributed mapping is advantageous as there is no or less interference from other synchronisation signal sequence 310-1, 310-2.

One other detection implementation is using only one long matched filter related to multiple synchronisation signal sequences 310-1, 310-2. Performance evaluation is done assuming different frequency offset for localised mapping and distributed mapping, as further illustrated in FIG. 4.

Figure 4:
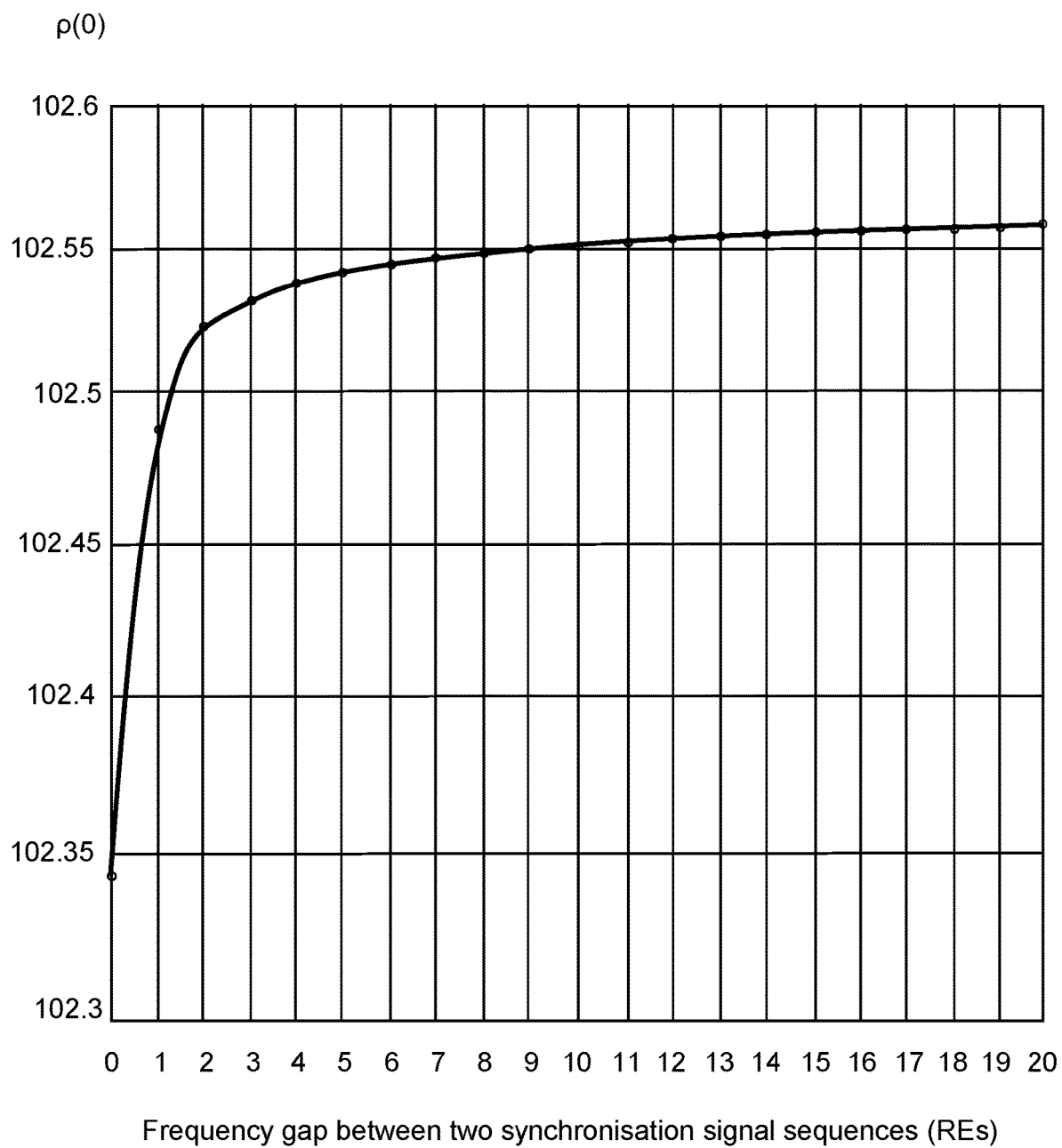
FIG. 4 is a diagram illustrating an auto-correlation value $\rho(0)$ as dependent on the frequency offset between two synchronisation signal sequences.

FIG. 4 is a diagram illustrating an auto-correlation value ρ(0) as dependent on the frequency offset, or gap 320 between two adjacent synchronisation signal sequences 310-1, 310-2, i.e. the number of intermediate resource elements 330 between two adjacent synchronisation signal sequences 310-1, 310-2.

The auto-correlation value ρ(0) is given in FIG. 4, where the simulated bandwidth of LTE signal is 20 MHz with a transmission bandwidth of 100 PRB, the root index u=25, Δf=15 kHz and $\Delta f_1$ is 5 kHz. The two adjacent synchronisation signal sequences 310-1, 310-2 are mapped to resource element with frequency index [569, 570, . . . , 630, 631 delta+, . . . , 661+delta, 663+delta, . . . , 693+delta], where delta is the size of the frequency gap 320, i.e. a non-negative integer specifying the number of intermediate resource elements 330 between the two adjacent synchronisation signal sequences 310-1, 310-2. It can be observed from the evaluation results that there is a gain in case of carrier frequency offset 320 when distributed mapping is used instead of localised mapping; i.e. by providing at least one intermediate resource element 330 in the frequency gap 320.

It may be noted that the at least two synchronisation signal sequences 310-1, 310-2 mapped to one OFDM symbol 220 in a distributed way also may comprise one implementation that more than one group of synchronisation signal sequences 310-1, 310-2 are mapped with a frequency gap 320, where a group of synchronisation signal sequences 310-1, 310-2 may comprise more than one synchronisation signal sequence 310-1, 310-2 and be mapped in a localised way (i.e. there is no frequency gap 320 between two adjacent synchronisation signal sequences 310-1, 310-2 within the group). In this way, the mapping may be seen as a combination of localised and distributed mapping which also provides the advantages of increased frequency diversity, less interference from the adjacent synchronisation signal sequence 310-1, 310-2 according to some embodiments.

It may be noted that various different embodiments may apply to at least two synchronisation signal sequences 310-1, 310-2 mapped to one OFDM symbol 220, which could be multiple PSS sequences 310-1, 310-2, multiple SSS sequences 310-1, 310-2, and/or a combination of at least one PSS sequence 310-1, 310-2 and at least one SSS sequence 310-1, 310-2 in different embodiments.

As at least two synchronisation signal sequences 310-1, 310-2 are mapped in the resource elements 210-1, 210-2, ..., 210-61 distributed in the frequency domain, one further issue is determining what to be transmitted in the frequency gap 320. If this OFDM symbol 220 with at least two synchronisation signal sequences 310-1, 310-2 is part of DRS, the OFDM symbol 220 may comprise PDSCH and/or CRS in some embodiments.

One key feature of LTE PSS is that it is generated in order to enable low-complex receiver implementations which results in a time symmetry property, i.e. $s_u(n)=s(N-n)$. It has been shown that a time symmetry property can be achieved if a frequency symmetry property around the DC subcarrier 340 is achieved, i.e. $H_u(n)=H_u(-n)=H_u(N-n)$. The time symmetry property according to some embodiments ensures low-complex receiver implementations. One bandpass filter with the central frequency within the frequency gap 320 between two adjacent component PSS sequences 310-1, 310-2 can be used to extract the frequency elements 210-1, 210-2, ..., 210-61 associated with the multiplexed PSS sequence 310-1, 310-2 in some embodiments.

In LTE, CRS are mapped to one resource element in every six resource elements in an OFDM symbol 220 containing CRS, where which of resource elements 210 in a group of six resource elements is used is dependent on $v_{shift}=N_{ID}^{cell}$ mod 6, $N_{ID}^{cell}$ is the cell identity. This causes the uncertainty of the mapping during the frequency gap 320 in case CRS is introduced. In addition, the CRS sequence is generated from the cell ID, which again causes the uncertainty of the signal transmitted during the frequency gap 320 at the intermediate at least one resource element 330. Furthermore, as CRS sequence and the mapping to the resource elements 330 do not satisfy the frequency domain symmetry property, it will not be able to achieve low-complex receiver implementation. Therefore CRS may not be transmitted in the frequency gap 320 according to some embodiments. Similar observations related to PDSCH generation holds for PDSCH. Therefore PDSCH may not be transmitted in the frequency gap 320 in some embodiments, for achieving low-complex receiver implementation.

It would therefore be beneficial not to map CRS or PDSCH in the intermediate resource elements 330 of the frequency gap 320. The resource elements 330 in the frequency gap 320 may in some embodiments be left un-modulated (e.g. the same as the DC subcarrier 340), which provides the advantages of easy implementation, less inter-carrier interference in case of a frequency offset 320 while also maintaining the time domain symmetry. It would according to some alternative embodiments be possible to transmit some type of sequences in the frequency gap 320 which satisfies the time symmetry of the compound resulting signal, at the cost of additional complexity of transmitting new signals and the use of the power.

For the distrusted mapping, there are M component synchronisation signal sequences 310-1, 310-2 multiplexed in one OFDM symbol 220.

Figure 5A:
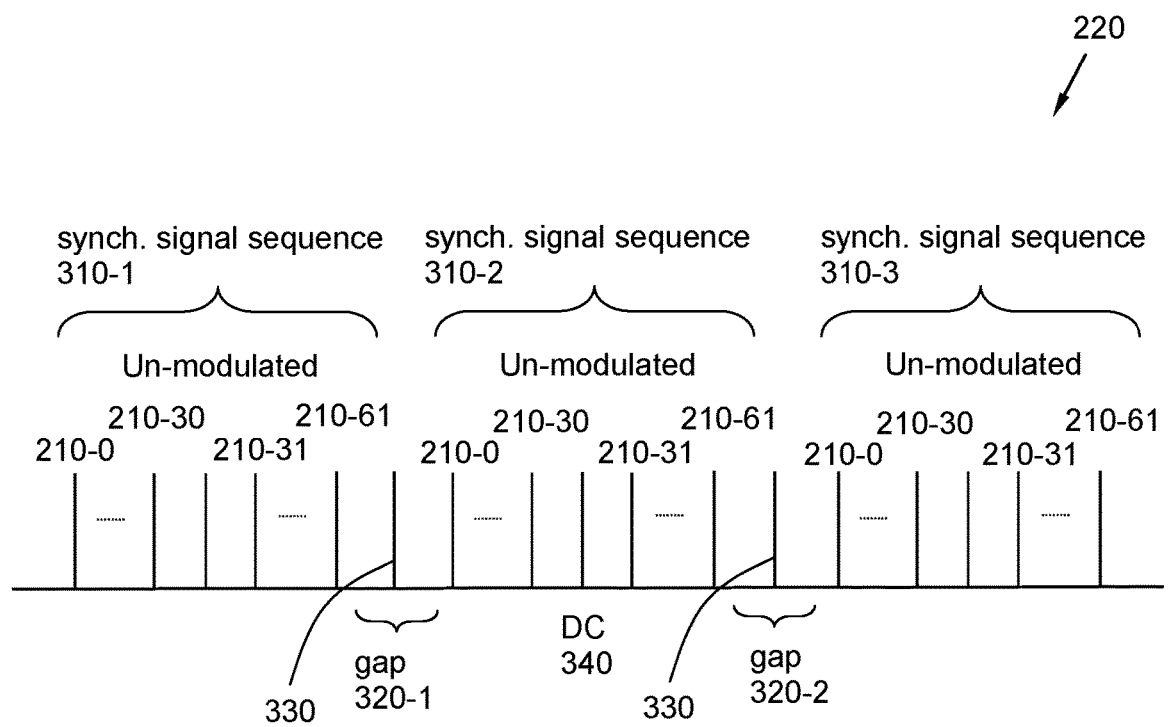
FIG. 5A is a block diagram illustrating three component synchronisation signal sequences mapped to resource elements using distributed mapping according to an embodiment.

If M is an odd integer exceeding 1, one example of mapping is given in FIG. 5A assuming M=3, where the central component synchronisation signal sequence 310-2 is mapped like in LTE, i.e. mapped to 62 successively indexed resource elements 210 around the DC carrier 340, while each of the other two component synchronisation signal sequences 310-1, 310-3 are mapped to 63 resource elements 210 with the central resource element 340 un-modulated. The frequency gaps 320-1, 320-2 between each of the side component synchronisation signal sequences 310-1, 310-3 and the central component synchronisation signal sequence 310-2 may be the same to ensure the side component synchronisation signal sequences 310-1, 310-3 are mapped in the frequency domain symmetrically. This is advantageous as it ensures the time symmetry of the synchronisation signal sequences 310-1, 310-2, 310-3 and also allows a multi-step detection, where in the first step a legacy compatible synchronisation signal sequence detection of low complexity can be used and the second step of using multiple synchronisation signal sequences 310-1, 310-2, 310-3 can be used if the first step is not able to provide sufficient performance.

Figure 5B:
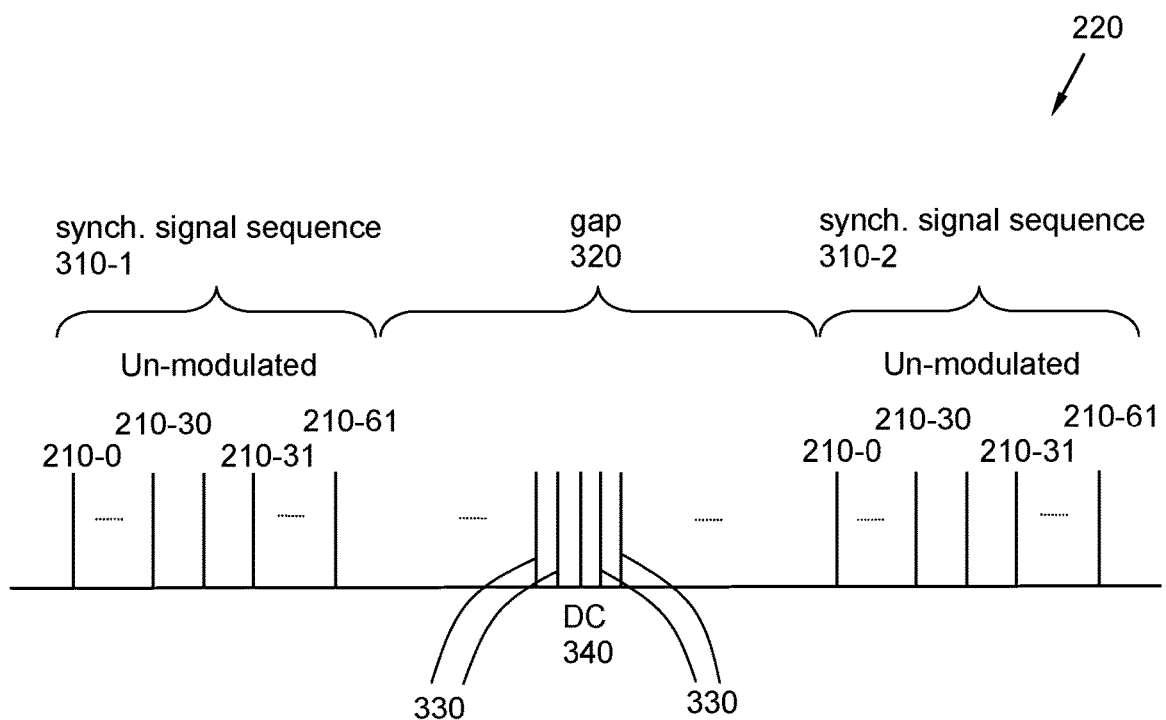
FIG. 5B is a block diagram illustrating two component synchronisation signal sequences mapped to resource elements using distributed mapping, according to an embodiment.

In case M is an even integer, i.e., an even number of component synchronisation signal sequences 310-1, 310-2 are multiplexed in one OFDM symbol 220, one example of mapping is given in FIG. 5B assuming M=2, where each of the two component synchronisation signal sequences 310-1, 310-2 are mapped to 63 resource elements 210 with the central resource element 340 un-modulated. The frequency gap 320 between the adjacent synchronisation signal sequences 310-1, 310-2 in case M>2 (still being an even integer) may be set to equal size in some embodiments to ensure the synchronisation signal sequences 310-1, 310-2, ..., 310-M are mapped in the frequency domain symmetrically. The frequency gap 320 may contain an even number of resource elements 330, i.e. the difference between the highest frequency index of the resource elements 210-1, 210-2, ..., 210-61 for one synchronisation signal sequence 310-1 and the lowest frequency index of the resource elements 210-1, 210-2, ..., 210-61 for an adjacent synchronisation signal sequence 310-2 is even. This is advantageous as it ensures the time symmetry of the synchronisation signal sequences 310-1, 310-2, ..., 310-M, while also being able to provide frequency diversity.

Figure 6:
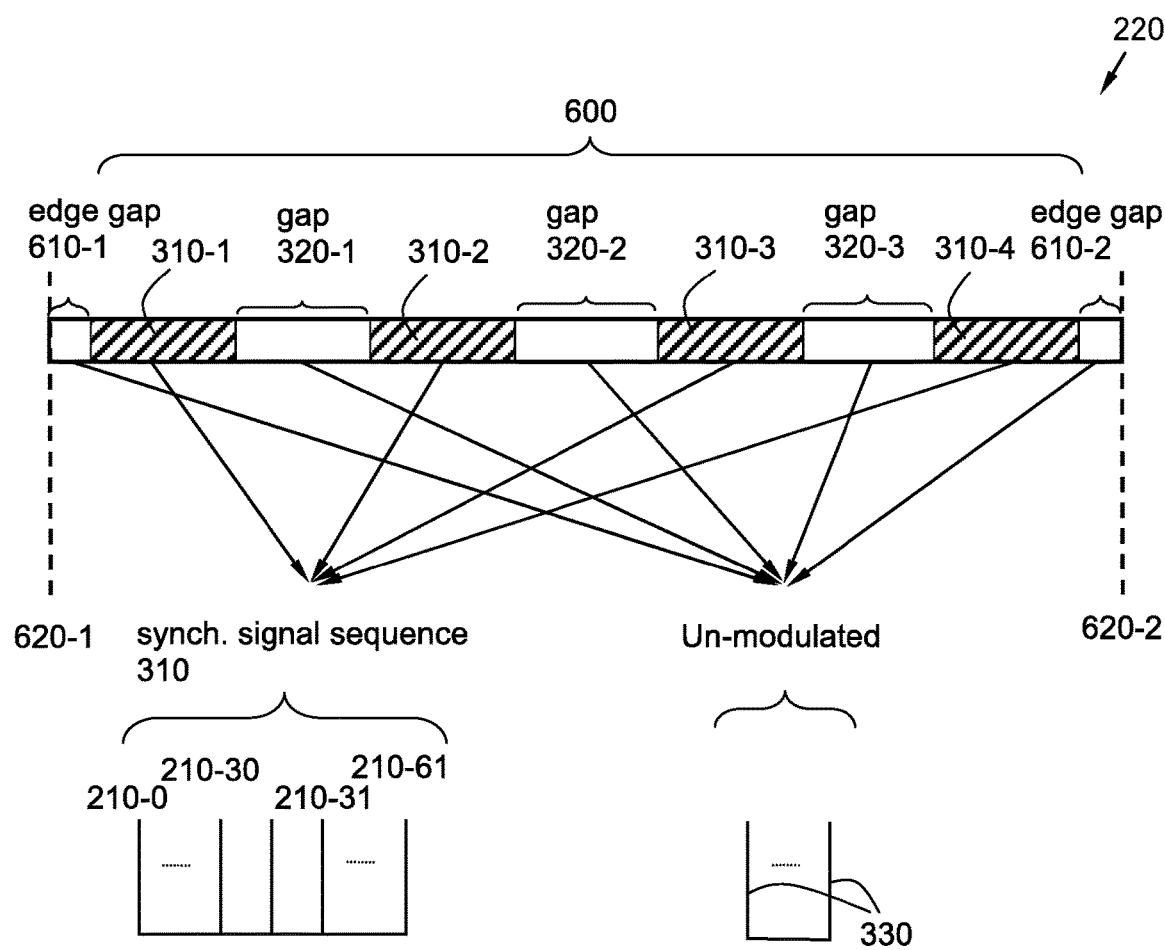
FIG. 6 is a block diagram illustrating four component synchronisation signal sequences mapped to resource elements using distributed mapping to a 5 MHz LAA cell, according to an embodiment.

FIG. 6 is a block diagram illustrating four component synchronisation signal sequence 310-1, 310-2, 310-3, 310-4 mapped to resource elements 210-1, 210-2, ..., 210-61 using distributed mapping to a 5 MHz LAA cell, according to an embodiment.

The synchronisation signal sequences 310-1, 310-2, 310-3, 310-4 and the intermediate frequency gaps 320-1, 320-2, 320-3 are situated in an inner frequency range 600, which also may be referred to as delta$_2$.

To map multiple synchronisation signal sequences 310-1, 310-2, ..., 310-M in one OFDM symbol 220, an edge gap 610-1, 610-2 of zero length or a length of integer resource elements may be defined between the edge synchronisation signal sequences 310-1, 310-M and the band edge 620-1, 620-2 or the nearest Physical Resource Block (PRB) edge. One example mapping is given in FIG. 6, where 4 synchronisation signal sequences 310-1, 310-2, 310-3, 310-4 are mapped to one OFDM symbol 220 in a 5 MHz LAA cell, the frequency gap 320 is the gap between two adjacent synchronisation signal sequences 310-1, 310-2, 310-3, 310-4 and the edge gap 610-1, 610-2 is the gap between the edge synchronisation signal sequences 310-1, 310-M and the band edge 620-1, 620-2 or the nearest PRB edge. It may be noted that LTE techniques only uses the transmission bandwidth in a system bandwidth to allow some guard band, e.g. 25 PRB transmission bandwidth in 5 MHz system. Even when the edge gap 610-1, 610-2 is set to zero, the guard band at the band edge is 0.25 MHz (or slightly less in case DC subcarrier 340 is considered). Therefore, the edge gap 610-1, 610-2 may be set smaller than the frequency gap 320 to ensure maximum frequency diversity and similar guard band for each individual synchronisation signal sequence 310-1, 310-2, 310-3, 310-4.

In some embodiments, the edge gaps 610-1, 610-2 may be set to zero while the frequency gaps 320-1, 320-2, 320-3 may be set to 16 resource elements 330, i.e. 4 component synchronisation signal sequence 310-1, 310-2, 310-3, 310-4 may be mapped to frequency elements {k+(0, . . . , 30, 32, . . . , 62)}, {k+(79, . . . , 109, 111, . . . , 141)}, {k+(158, . . . , 188, 190, . . . , 220)}, {k+(237, . . . , 267, 269, . . . , 299)}, where k is non-negative integer, and k+299 is no greater than the highest frequency index of all the resource elements 210.

It may be mentioned that the edge gaps 610-1, 610-2 may be set to the same or different values in different embodiments. Also the frequency gaps 320-1, 320-2, 320-3 may be set to the same, or different values, i.e. comprising the same, or different numbers of intermediate resource elements 330 in different embodiments.

In one embodiment, the edge gaps 610-1, 610-2 may be set to k1 while the frequency gaps 320-1, 320-2, 320-3 may be set to k2 resource elements 330. Thus four component synchronisation signal sequence 310-1, 310-2, 310-3, 310-4 are mapped to frequency elements {k1+(0, . . . , 30, 32, . . . , 62)}, {k1+k2+(63, . . . , 93, 95, . . . , 125)}, {k1+2*k2+(126, . . . , 156, 158, . . . , 188)}, {k1+3*k2+(189, . . . , 219, 221, . . . , 251)}, where k2>k1>=0, and k1 is the gap 610-1 between the lowest frequency resource element index of transmission band (i.e. 0) and the lowest frequency resource element index mapped by the synchronisation signal sequence 310-1, 310-2, 310-3, 310-4, or the gap between the lowest frequency resource element index mapped by the synchronisation signal sequence 310-1, 310-2, 310-3, 310-4 and the nearest PRB edge not mapped by the synchronisation signal sequence 310-1, 310-2, 310-3, 310-4.

In one embodiment, the transmitter 110, e.g. an LAA eNB, may transmit the OFDM symbol 220 comprising multiple component synchronisation signal sequences 310-1, 310-2, 310-3, 310-4 in a DRS subframe, where CRS is also transmitted in the same OFDM symbol 220. Multiple component synchronisation signal sequences 310-1, 310-2, 310-3, 310-4 may be mapped to resource elements 210 around the DC subcarrier 340, which may be referred to as inner frequency range, while CRS may be mapped to resource elements 210 outside of the inner frequency range, which may be referred to as outer frequency range. In addition, there may be a wireless system with different LAA eNBs using different bandwidth options. The same repetition factor for synchronisation signal sequence repetition is used for different bandwidth options. Within the inner frequency range, the mapping to the resource elements 210 may be the same for different bandwidth options in some embodiments.

LAA may support multiple bandwidth options, such as 5 MHz, 10 MHz, 15 MHz and/or 20 MHz, in some non-limiting examples. If synchronisation signal sequences 310-1, 310-2, 310-3, 310-4 are repeated in the frequency domain, In a given SNR condition, the detection performance of could be approximately determined by the frequency multiplexing gain, i.e. how many times the synchronisation signal sequences 310-1, 310-2, 310-3, 310-4 are repeated, also referred as repetition factor. Given a repetition factor is used for a small bandwidth LAA cell, e.g. 5 MHz, the same repetition factor may be sufficient by a large bandwidth cell, 20 MHz. In addition, the frequency pattern may be the same to reduce the receiver detection complexity, i.e. the receiver 120 is able to use the same synchronisation signal sequence detection algorithm for different LAA bandwidths.

Figure 7:
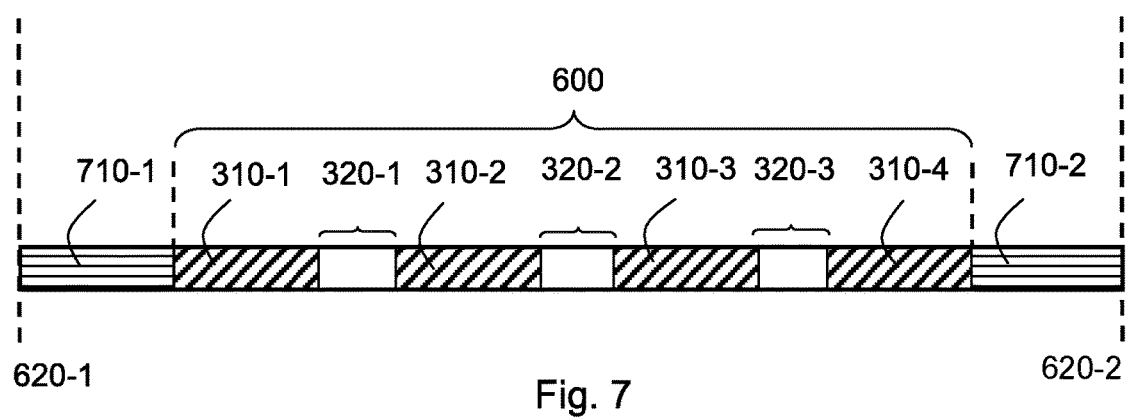
FIG. 7 is a block diagram illustrating an OFDM symbol with four component synchronisation signal sequences and reference signals.

To make use of the frequency resource also for other purposes, such as various signal strength measurements like Reference Signal Received Power (RSRP), Reference Signal Received Quality (RSRQ), Receive Strength Signal Indicator (RSSI), CRS can be added in the frequency domain, as in FIG. 7. As already explained, CRS may not be expected to exist/be transmitted within the synchronisation signal sequence frequency region in some embodiments. It may however exist in the frequency region outside of the synchronisation signal sequence frequency region in some embodiments, where the synchronisation signal sequence frequency region can be understood as the frequency range between the lowest indexed resource element 210 carrying the synchronisation signal sequence 310-1, 310-2, 310-3, 310-4 and the highest indexed resource element 210 carrying the synchronisation signal sequence 310-1, 310-2, 310-3, 310-4.

To maintain similar guard band for different bandwidth options, an LAA system 100 with larger bandwidth may blank some or several resource elements 210, i.e. not to be used by CRS. As explained above, the guard band of LAA 5 MHz could be up to around 0.25 MHz even when synchronisation signal sequences 310-1, 310-2, 310-3, 310-4 are mapped to the transmission band edge PRE. For a 20 MHz system, the transmitter 110 may blank several resource elements 210 to achieve some guard band for synchronisation signal sequences 310-1, 310-2, 310-3, 310-4 (e.g. PSS/SSS sequences), as in a 5 MHz system. Therefore the edge gaps 610-1, 610-2 may be larger than zero for at least a certain bandwidth option, i.e. there are a positive integer number of resource elements 210 not mapped by CRS between the closest resource element 210 mapped by synchronisation signal sequences 310-1, 310-2, 310-3, 310-4 and CRS, in some embodiments.

Thus any, some or all of a PDSCH, a CRS or a CSI-RS may be mapped to a set of resource elements 710-1, 710-2 of the OFDM symbol 220, wherein no synchronisation signal sequences 310-1, 310-2, 310-3, 310-4 are mapped.

Figure 8:
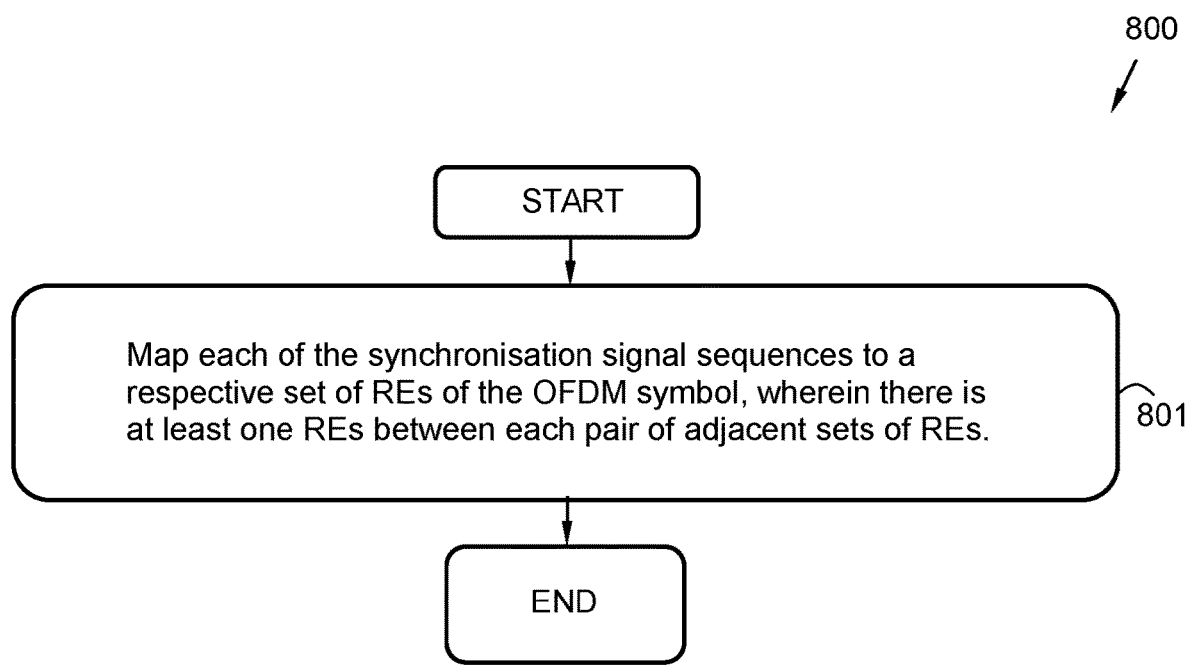
FIG. 8 is a flow chart illustrating a method in a transmitter according to an embodiment.

FIG. 8 is a flow chart illustrating embodiments of a method 800 in a processor.

The processor may be comprised e.g. in a transmitter 110, configured for transmitting the OFDM symbol 220 comprising multiple synchronisation signal sequences 310-1, 310-2, 310-3, 310-4 to be received by a receiver 120. Such transmitter 110 may comprise a network node such an LAA eNodeB while the receiver 120 may comprise a UE in some embodiments. The transmitter 110 and the receiver 120 may be comprised in a wireless communication network 100.

Such wireless communication network 100 may be based on LAA.

The method 800 comprises the subsequent action 801.

Action 801 comprises mapping each of the synchronisation signal sequences 310-1, 310-2, 310-3, 310-4 to a respective set of resource elements 210-0, 210-1, ..., 210-61 of the OFDM symbol 220, wherein there is at least one intermediate resource element 330 between each pair of adjacent sets of resource elements 210-0, 210-1, ..., 210-61.

The adjacent sets of resource elements 210-0, 210-1, ..., 210-61 are adjacent in the frequency domain, not in the time domain as all resource elements 210-0, 210-1, ..., 210-61 of the OFDM symbol 220 are located at the same time period.

According to some embodiments, no PDSCH, CRS and/or CSI-RS is allowed to be transmitted in the at least one intermediate resource element 330 between each pair of adjacent sets of resource elements 210-0, 210-1, ..., 210-61.

According to some embodiments, no reference signal at all is allowed to be transmitted in the at least one intermediate resource element 330 between each pair of adjacent sets of resource elements 210-0, 210-1, ..., 210-61.

According to some embodiments, no signal and/or channel at all is allowed to be transmitted in the at least one intermediate resource element 330 between each pair of adjacent sets of resource elements 210-0, 210-1, ..., 210-61.

In some further embodiments, the mapping of the at least two synchronisation signal sequences 310-1, 310-2, 310-3, 310-4 to the respective set of resource elements 210-0, 210-1, ..., 210-61 of the OFDM symbol 220 may be made, wherein there are at least five resource elements 330 between each pair of adjacent sets of resource elements 210-0, 210-1, ..., 210-61. It may be noted that although only one synchronisation signal sequence is mapped to one OFDM symbol 220 for LTE release 8, the mapping is done in a way that a length-62 synchronisation signal sequence is mapped to 72 resource elements, resulting 5 resource elements not mapped by synchronisation signal for each side. This may be especially helpful to reusing an LTE release 8 synchronisation signal based filter implementation as the same empty resource elements are maintained.

Furthermore according to some embodiments, delta$_0$ 610-1, 610-2 may be smaller than delta$_1$ 320-1, 320-2, 320-3, wherein delta$_1$ 320-1, 320-2, 320-3 is the number of resource elements 330 between at least one pair of adjacent sets of resource elements 210-0, 210-1, ..., 210-61; and delta$_0$ (610-1, 610-2) is derived from one of the following:
delta$_0$=$k_0$-$k_2$, where $k_0$ is the lowest frequency index of said resource elements 210-0, 210-1, ..., 210-61, and $k_2$ is the lowest frequency index of all the resource elements 210 of said OFDM symbol 220;
delta$_0$=$k_3$-$k_1$, where $k_1$ is the highest frequency index of said resource elements 210-0, 210-1, ..., 210-61, and $k_3$ is the highest frequency index of all the resource elements 210 of said OFDM symbol 220;
delta$_0$=12×(ceil (($k_1$-$k_0$+1)/12))-($k_1$-$k_0$+1))/2, where $k_0$ is the lowest frequency index of said resource elements 210-0, 210-1, ..., 210-61, $k_1$ is the highest frequency index of said resource elements 210-0, 210-1, ..., 210-61, ceil (x) means the smallest integer not smaller than x.

According to some embodiments, the mapping of the at least two synchronisation signal sequences 310-1, 310-2, 310-3, 310-4 may be made with the same number of synchronisation signal sequences 310-1, 310-2, 310-3, 310-4 for at least two different transmission bandwidth values like 5 MHz and 10 MHz.

In some additional embodiments, the mapping may be made such that wherein delta$_2$ 600 is the same for at least two different transmission bandwidth values, where delta$_2$=$k_1$-$k_0$; $k_0$ is the lowest frequency index of said resource elements 210-0, 210-1, ..., 210-61, and $k_1$ is the highest frequency index of said resource elements 210-0, 210-1, ..., 210-61.

Furthermore, according to some embodiments, another set of resource elements 710-1, 710-2 of the OFDM symbol 220 may be used for transmission of at least one of the following: a PDSCH; a CRS; a CSI-RS.

According to some alternative embodiments, each of the at least two synchronisation signal sequences 310-1, 310-2, 310-3, 310-4 may be mapped to 62 resource elements 210-0, 210-1, ..., 210-61.

In some further embodiments, the method 800 may comprise aggregation of a carrier in a licensed frequency spectrum and a carrier in an unlicensed frequency spectrum. Also the at least two synchronisation signal sequences 310-1, 310-2, 310-3, 310-4 may comprise PSS, SSS, or a combination thereof.

According to some embodiments, the same number of intermediate resource elements 330 between each pair of adjacent sets of resource elements 210-0, 210-1, ..., 210-61 may be mapped in the OFDM symbol 220.

Further in case there are an even number of resource elements 330 between at least one pair of adjacent resource elements 210-0, 210-1, ..., 210-61 when there are an even number of synchronisation signal sequences 310-1, 310-2, 310-3, 310-4 mapped to the OFDM symbol 220, according to some embodiments.

Figure 9:
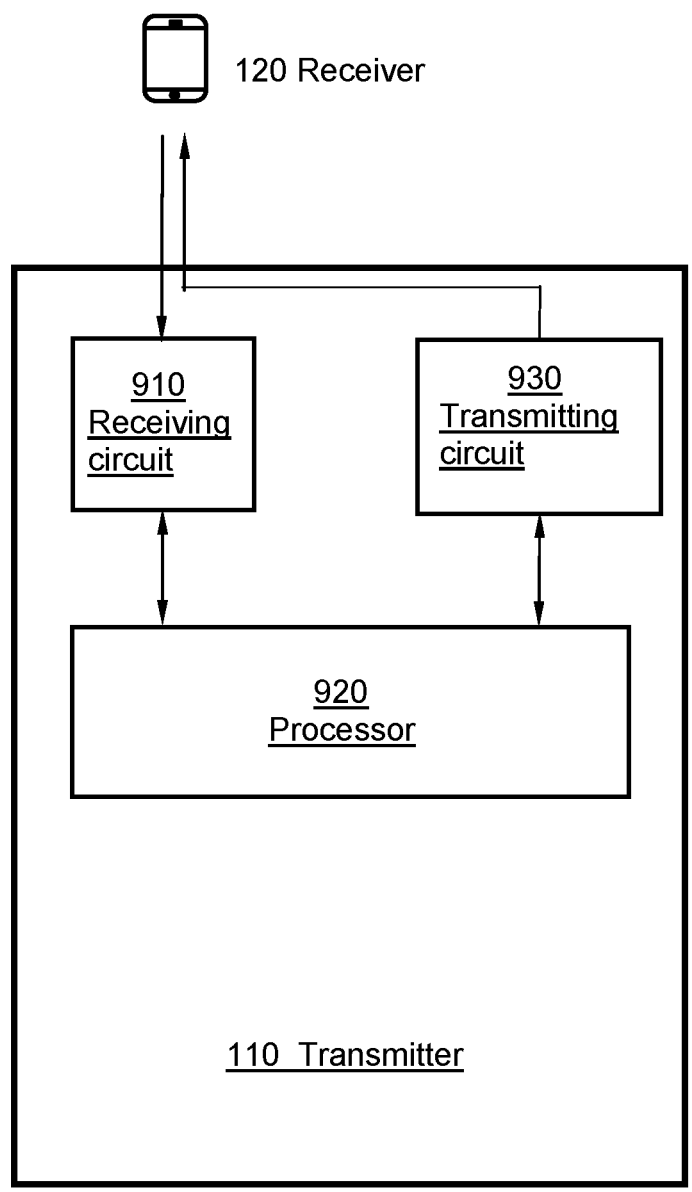
FIG. 9 is a block diagram illustrating a transmitter according to an embodiment.

FIG. 9 illustrates an embodiment of a transmitter 110, comprising a processor 920. The processor 920 is configured to map at least two synchronisation signal sequences 310-1, 310-2, 310-3, 310-4 to a respective set of resource elements 210-0, 210-1, ..., 210-61 of the OFDM symbol 220, wherein there is at least one intermediate resource element 330 between each pair of adjacent sets of resource elements 210-0, 210-1, ..., 210-61, by performing the previously described method 800 according to action 801.

The processor 920 may also be configured to disallow transmission of PDSCH, CRS and/or CSI-RS in the at least one intermediate resource element 330 between each pair of adjacent sets of resource elements 210-0, 210-1, ..., 210-61.

The adjacent sets of resource elements 210-0, 210-1, ..., 210-61 are adjacent in the frequency domain, not in the time domain as all resource elements 210-0, 210-1, ..., 210-61 of the OFDM symbol 220 are located at the same time period.

In some embodiments, the processor 920 may be configured to disallow transmission of any signal or channel at all in the at least one intermediate resource element 330 between each pair of adjacent sets of resource elements 210-0, 210-1, ..., 210-61.

The processor 920 may additionally be configured to map the at least two synchronisation signal sequences 310-1, 310-2, 310-3, 310-4 to the respective set of resource elements 210-0, 210-1, ..., 210-61 of the OFDM symbol 220, wherein there are at least five resource elements 330 between each pair of adjacent sets of resource elements 210-0, 210-1, ..., 210-61.

Further, the processor 920 may be configured to map the at least two synchronisation signal sequences 310-1, 310-2,

310-3, 310-4, to the respective set of resource elements 210-0, 210-1, ..., 210-61 of the OFDM symbol 220 such that delta$_0$ 610-1, 610-2 may be smaller than delta$_1$ 320-1, 320-2, 320-3, wherein delta$_1$ 320-1, 320-2, 320-3 is the number of resource elements 330 between at least one pair of adjacent sets of resource elements 210-0, 210-1, ..., 210-61; and delta$_0$ (610-1, 610-2) is derived from one of the following:

delta$_0$=k$_0$−k$_2$, where k$_0$ is the lowest frequency index of said resource elements 210-0, 210-1, ..., 210-61, and k$_2$ is the lowest frequency index of all the resource elements 210 of the OFDM symbol 220;

delta$_0$=k$_3$−k$_1$, where k$_1$ is the highest frequency index of said resource elements 210-0, 210-1, ..., 210-61, and k$_3$ is the highest frequency index of all the resource elements 210 of the OFDM symbol 220;

delta$_0$=12×(ceil ((k$_1$−k$_0$+1)/12))−(k$_1$−k$_0$+1))/2, where k$_0$ is the lowest frequency index of said resource elements 210-0, 210-1, ..., 210-61, k$_1$ is the highest frequency index of said resource elements 210-0, 210-1, ..., 210-61, ceil (x) means the smallest integer not smaller than x.

Furthermore the processor 920 in addition, according to some embodiments, may be configured to map the at least two synchronisation signal sequences 310-1, 310-2, 310-3, 310-4 may be made with the same number of synchronisation signal sequences 310-1, 310-2, 310-3, 310-4 for at least two different transmission bandwidth values like 5 MHz and 10 MHz.

In addition the processor 920 may be configured to map the at least two synchronisation signal sequences 310-1, 310-2, 310-3, 310-4 such that wherein delta$_2$ 600 is the same for at least two different transmission bandwidth values, where delta$_2$=k$_1$−k$_0$; k$_0$ is the lowest frequency index of said resource elements 210-0, 210-1, ..., 210-61, and k$_1$ is the highest frequency index of said resource elements 210-0, 210-1, ..., 210-61.

Also the processor 920 may be configured to utilise another set of resource elements 710-1, 710-2 of the OFDM symbol 220 for transmission of at least one of the following: a PDSCH; a CRS; a CSI-RS.

The processor 920 may further be configured to map each of the at least two synchronisation signal sequences 310-1, 310-2, 310-3, 310-4 to 62 resource elements 210-0, 210-1, ..., 210-61.

In some further embodiments, the processor 920 may further be configured to aggregate a carrier in a licensed frequency spectrum and a carrier in an unlicensed frequency spectrum. Also the at least two synchronisation signal sequences 310-1, 310-2, 310-3, 310-4 may comprise PSS, SSS, or a combination thereof.

According to some embodiments, the processor 920 may be configured to map the same number of intermediate resource elements 330 between each pair of adjacent sets of resource elements 210-0, 210-1, ..., 210-61 in the OFDM symbol 220.

Further the processor 920 may be configured to map the at least two synchronisation signal sequences 310-1, 310-2, 310-3, 310-4, to the respective set of resource elements 210-0, 210-1, ..., 210-61 of the OFDM symbol 220, wherein there are an even number of resource elements 330 between at least one pair of adjacent resource elements 210-0, 210-1, ..., 210-61 when there are an even number of synchronisation signal sequences 310-1, 310-2, 310-3, 310-4 mapped to the OFDM symbol 220.

Such processor 920 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The transmitter 110 also comprises a transmitting circuit 930, configured to transmit the OFDM symbol 220 comprising the multiple synchronisation signal sequences 310-1, 310-2, 310-3, 310-4 to a receiver 120.

Furthermore the transmitter 110 also may comprise a receiving circuit 910 in some embodiments, for receiving wireless signalling.

The method 800 comprising the action 801 may be implemented through the one or more processors 920 in the transmitter 110 together with computer program product for performing the functions of the action 801.

Thus a computer program comprising program code for performing the method 800 according to any embodiment of action 801, may be performed when the computer program is loaded in the processor 920.

The computer program product mentioned above may be provided for instance in the form of a data carrier carrying computer program code for performing at least some of the actions 801 according to some embodiments when being loaded into the processor 920. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the transmitter 110, e.g., over an Internet or an intranet connection.

Figure 10:
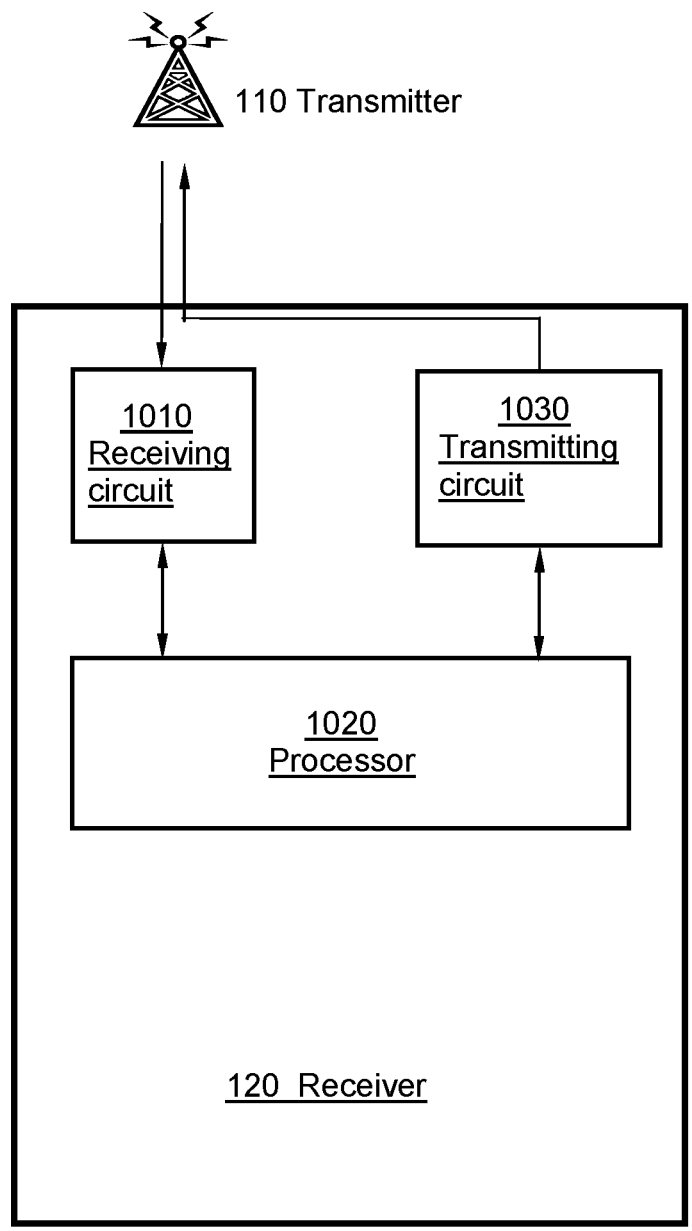
FIG. 10 is a block diagram illustrating a receiver according to an embodiment.

FIG. 10 discloses a receiver 120 for receiving the OFDM symbol 220 comprising multiple, i.e. at least two, synchronisation signal sequences 310-1, 310-2, 310-3, 310-4 from the transmitter 110.

The receiver 120 comprises a receiving circuit 1010, configured to receive the OFDM symbol 220 comprising the multiple synchronisation signal sequences 310-1, 310-2, 310-3, 310-4 from a transmitter 110.

The receiver 120 further comprises a processor 1020. The processor 1020 is configured to detect at least two synchronisation signal sequences 310-1, 310-2, 310-3, 310-4 from a respective set of resource elements 210-0, 210-1, ..., 210-61 of the OFDM symbol 220, wherein there is at least one resource element 330 between each pair of adjacent sets of resource elements 210-0, 210-1, ..., 210-61, wherein the at least two synchronisation signal sequences 310-1, 310-2, 310-3, 310-4 have been mapped to the respective set of resource elements 210-0, 210-1, ..., 210-61 of the OFDM symbol 220 by a processor 920 in a transmitter 110.

Furthermore, the receiver 120 may comprise a transmitting circuit 1030, configured to transmit wireless signals.

Furthermore, the processor 1020 may perform a method for detecting at least two synchronisation signal sequences 310-1, 310-2, 310-3, 310-4 from a respective set of resource elements 210-0, 210-1, ..., 210-61 of the OFDM symbol 220, wherein there is at least one resource element 330 between each pair of adjacent sets of resource elements 210-0, 210-1, ..., 210-61.

The terminology used in the description of the embodiments as illustrated in the accompanying drawings is not intended to be limiting of the described methods 800, 1000 and/or transmitter 110 and/or receiver 120. Various changes, substitutions and/or alterations may be made, without departing from the embodiments of the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. An apparatus, comprising
a first processor, the first processor configured to:
map at least two synchronisation signal sequences to a respective set of resource elements of an Orthogonal Frequency-Division Multiplexing (OFDM) symbol, wherein there is at least one resource element between each pair of adjacent sets of resource elements, wherein the first processor is configured to disallow transmission of:
a Physical Downlink Shared Channel (PDSCH);
a Cell-specific Reference Signal (CRS); or
a Channel State Information Reference Signal (CSI-RS);
in the at least one resource element between each pair of adjacent sets of resource elements.

2. The apparatus according to claim 1, wherein the first processor is configured to map the at least two synchronisation signal sequences to the respective set of resource elements of the OFDM symbol, wherein there are at least five resource elements between each pair of adjacent sets of resource elements.

3. The apparatus according to claim 1, wherein the first processor is configured to map the at least two synchronisation signal sequences, to the respective set of resource elements of the OFDM symbol, wherein $delta_0$ is smaller than $delta_1$, and:
wherein $delta_1$ is a number of resource elements between at least one pair of adjacent sets of resource elements; and
$delta_0$ is derived from one of the following:
$delta_0 = k_0 - k_2$, where $k_0$ is a lowest frequency index of said resource elements, and $k_2$ is a lowest frequency index of all the resource elements of said OFDM symbol;
$delta_0 = k3 - k_1$, where $k_1$ is a highest frequency index of said resource elements, and $k_3$ is a highest frequency index of all the resource elements of said OFDM symbol; or
$delta_0 = (12 \times (ceil((k_1 - k_0 + 1)/12)) - (k_1 - k_0 + 1))/2$, where $k_0$ is a lowest frequency index of said resource elements, $k_1$ is a highest frequency index of said resource elements, ceil (x) means a smallest integer not smaller than x.

4. The apparatus according to claim 1, wherein the first processor is configured to map the at least two synchronisation signal sequences with the same number of synchronisation signal sequences for at least two different transmission bandwidth values.

5. The apparatus according to claim 1, wherein the first processor is configured to map the at least two synchronisation signal sequences, to the respective set of resource elements of the OFDM symbol, wherein $delta_2$ is the same for at least two different transmission bandwidth values, where
$delta_2 = k_1 - k_0$; $k_0$ is a lowest frequency index of said resource elements, and $k_1$ is a highest frequency index of said resource elements.

6. The apparatus according to claim 1, wherein there are another set of resource elements of the OFDM symbol used for transmission of at least one of the following:
a PDSCH;
a CRS;
a CSI-RS.

7. The apparatus according to claim 1, wherein the first processor is configured to map each of the at least two synchronisation signal sequences to 62 resource elements.

8. The apparatus according to claim 1, wherein the first processor is configured for communication by aggregation of a carrier in a licensed frequency spectrum and a carrier in an unlicensed frequency spectrum; and
the at least two synchronisation signal sequences comprises a Primary Synchronisation Signal (PSS) or a Secondary Synchronisation Signal (SSS) or a combination thereof.

9. The apparatus according to claim 1, wherein the first processor is configured to map a same number of resource elements between each pair of adjacent sets of resource elements in the OFDM symbol.

10. The apparatus according to claim 1, wherein the first processor is configured to map the at least two synchronisation signal sequences, to the respective set of resource elements of the OFDM symbol, wherein there are an even number of resource elements between at least one pair of adjacent resource elements when there are an even number of synchronisation signal sequences mapped to the OFDM symbol.

11. The apparatus of claim 1, further comprising:
a transmitter, the transmitter configured to transmit the OFDM symbol comprising the multiple synchronisation signal sequences to a receiver, wherein the transmitter comprises the first processor and a transmitting circuit.

12. The apparatus of claim 11, wherein the apparatus is part of a communication system and the communication system includes the receiver, the receiver including:
a second processor, the second processor configured to:
detect at least two synchronisation signal sequences from a respective set of resource elements of an OFDM symbol, wherein there is at least one resource element between each pair of adjacent sets of resource elements; and
wherein the at least two synchronisation signal sequences have been mapped to the respective set of resource elements of the OFDM symbol by the first processor.

13. A method implemented with a processor, comprising:
mapping each of at least two synchronisation signal sequences to a respective set of resource elements of an Orthogonal Frequency-Division Multiplexing (OFDM) symbol, wherein there is at least one resource element between each pair of adjacent sets of resource elements wherein transmission of:

a Physical Downlink Shared Channel (PDSCH);

a Cell-specific Reference Signal (CRS); or a Channel State Information Reference Signal (CSI-RS); is disallowed in the at least one resource element between each pair of adjacent sets of resource elements.

14. The method according to claim 13, wherein transmission of a signal or a channel in the at least one resource element between each pair of adjacent sets of resource elements is disallowed.

15. The method according to claim 13, further comprising:
mapping the at least two synchronisation signal sequences to the respective set of resource elements of the OFDM symbol, wherein there are at least five resource elements between each pair of adjacent sets of resource elements.

16. The method according to claim 13, further comprising:
mapping the at least two synchronisation signal sequences with a same number of synchronisation signal sequences for at least two different transmission bandwidth values.

17. The method according to claim 13, further comprising:
mapping the at least two synchronisation signal sequences, to the respective set of resource elements of the OFDM symbol, wherein $delta_2$ is the same for at least two different transmission bandwidth values, where $delta_2 = k_1 - k_0$; $k_0$ is a lowest frequency index of said resource elements, and $k_1$ is a highest frequency index of said resource elements.

18. A non-transitory computer-readable medium comprising code which, when executed by a processor, causes the processor to perform a method comprising:

mapping each of at least two synchronisation signal sequences to a respective set of resource elements of an Orthogonal Frequency-Division Multiplexing (OFDM) symbol, wherein there is at least one resource element between each pair of adjacent sets of resource elements, wherein transmission of:

a Physical Downlink Shared Channel (PDSCH);

a Cell-specific Reference Signal (CRS); or a Channel State Information Reference Signal (CSI-RS);

is disallowed in the at least one resource element between each pair of adjacent sets of resource elements.

\* \* \* \* \*